United States Patent [19]

Liu et al.

[11] Patent Number: 4,975,956
[45] Date of Patent: Dec. 4, 1990

[54] LOW-BIT-RATE SPEECH CODER USING LPC DATA REDUCTION PROCESSING

[75] Inventors: Yu J. Liu, Wharton; Joseph Rothweiler, Cranford, both of N.J.

[73] Assignee: ITT Corporation, New York, N.Y.

[21] Appl. No.: 385,644

[22] Filed: Jul. 26, 1989

[51] Int. Cl.⁵ .............................. G10L 5/00
[52] U.S. Cl. .......................... 381/36; 381/47
[58] Field of Search .................. 381/29–53; 375/122

[56] References Cited

U.S. PATENT DOCUMENTS 4,791,654 12/1988 De Marca ..................... 381/47
4,860,355 8/1989 Coperri ......................... 381/36

Primary Examiner—Emanuel S. Kemeny
Attorney, Agent, or Firm—Arthur L. Plevy

[57] ABSTRACT

A speech coder employs vector quantization of LPC parameters, interpolation, and trellis coding for improved speech coding at low bit rates (400 bps). The speech coder has an LPC analysis module for converting input speech to LPC parameters, an LSP conversion module for converting LPC parameters into line spectrum frequencies (LSP) data, and a vector quantization and interpolation (VQ/I) module for encoding the LSP data into vector indexes for transmission by applying LPC spectral amplitude as weighting coefficients to the LSP data. The VQ/I module outputs one vector index for every two LPC frames in order to reduce the transmission bit rate, and the omitted frames are interpolated on the receiving end. A decoder correspondingly decodes incoming indexes to LPC parameters and synthesizes them into output speech. Trellis coders with an adaptive tracking function encode the pitch and gain parameters of the LPC frames. A universal codebook stores codewords according to a plurality of accents. The speech coder automatically identifies a speaker's accent and selects the corresponding vocabulary of codewords in order to more intelligibly encode and decode the speaker's speech.

14 Claims, 3 Drawing Sheets

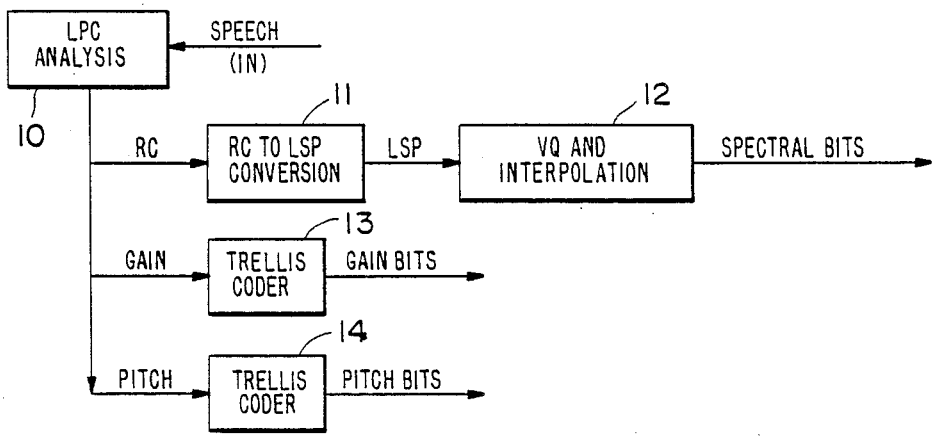
FIG. 1A
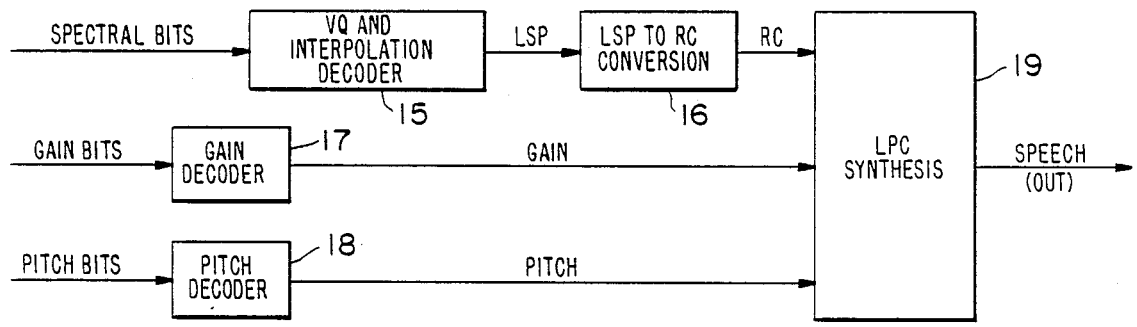
FIG. 1B
FIG. 2
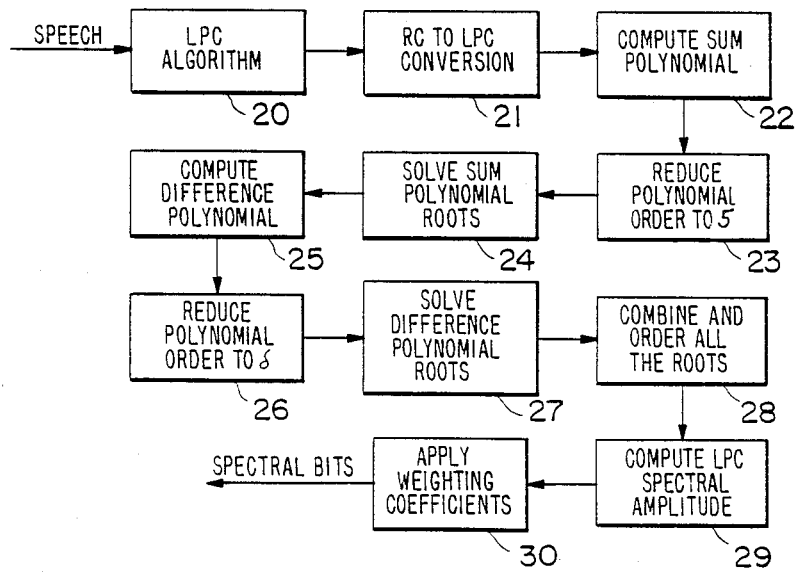

LOW-BIT-RATE SPEECH CODER USING LPC DATA REDUCTION PROCESSING

FIELD OF INVENTION

The present invention relates to a speech coder which operates at low-bit-rates, and particularly, to one which employs improved data reduction processing from and to LPC analysis and synthesis, respectively, of input and output speech signals.

BACKGROUND OF INVENTION

An effective low-bit-rate speech coder should have the characteristics of high speech intelligibility, speaker independence, ease of real time implementation and short throughput delay. To maintain low-bit-rate transmission and simultaneously achieve these goals is conventionally considered contradictory.

Various speech encoding algorithms and techniques have been proposed for encoding and decoding low-data-rate speech parameters from and to speech signals. Techniques for vector quantization of line spectrum pairs (LSP) data converted from standard linear predictive coding (LPC) parameters derived from input speech signals has been suggested, for example, in "Application of Line-Spectrum Pairs to Low-Bit-Rate Speech Encoders", by G. S. Kang and L. J. Fransen, Naval Research Laboratory, at Proceedings ICASSP, 1985, pp. 244–247. A tree-encoding technique using adaptive or time-varying quantization was disclosed by N. S. Jayant and S. A. Christensen, Bell Laboratories, at IEEE Transactions on Communications, COM-26, September 1978, pp. 1376–1379. For transmitted speech signals encoded by vector quantization, an improvement in decoding performance at the receiver end by optimization of the codebook for decoding words from the incoming signals was disclosed in "Improving The Codebook Design For Vector Quantization", by Y. J. Liu, ITT Defense Communication Division. at Proceedings IEEE Military Communications, 1987, pp. 556–559.

However, the prior art proposals leave much to be desired in terms of achieving high intelligibility and reliability at low data rates, e.g. 400 bits-per-second (bps), and particularly for speaker independent speech coding in communications over a high frequency (HF) channel in a hostile environment. In the prior systems, LSP coefficients are computed by fast Fourier transform (FFT). Also, the group delay function is utilized as weighting coefficients to compensate for distortion in the vector quantization. The latter is a time consuming process which may require even more time than that required to compute the LSP coefficients.

SUMMARY OF INVENTION

Therefore, it is a principal object of the invention to provide a high quality speech coder at low data rates of about 400 bps, and particularly to provide reliable communication over an HF channel in a hostile environment. It is a specific object to provide a speech coder which employs faster and more effective data reduction processing techniques, including vector quantization from LPC parameters, interpolation, and trellis coding for improved speech coding results.

In accordance with the invention, a speech coder system and related method comprises an encoder which includes an LPC analysis module for converting input speech to linear predictive coding (LPC) parameters for each of a sequence of LPC frames, an LSP conversion module for converting the LPC parameters to respective line spectrum frequencies (LSP) data, and a vector quantization and interpolation (VQ/I) encoder module for encoding the LSP data into vector indexes for transmission, wherein said VQ/I encoder module includes vector quantizing means for computing weighting coefficients for the LSP data, each of which is the product of LPC spectral amplitude and a predetermined factor, and means for applying said weighting coefficients to said LSP data.

In the preferred embodiment of the speech encoder, the vector quantization and- interpolation module outputs one vector index for every two LPC frames in order to reduce the transmission bit rate. On the receiving side, the transmitted LSP data is decoded to LPC frames, and the missing frame is interpolated from the adjacent frames. The speech coder system also includes trellis coders for coding the pitch and gain parameters of the LPC frames, respectively. The trellis coders include means for adaptively tracking successive sequences of a predetermined number of pitch or gain parameters, detecting a minimum distortion among the predetermined number of parameters in each successive sequence, and correcting the parameter for the corresponding LPC frame in accordance with the minimum distortion detected in the corresponding sequence of parameters.

The invention also encompasses a corresponding decoder having a vector quantization and interpolation decoder module and pitch and gain trellis decoders for decoding a transmission from the encoder into corresponding LPC parameters, and an LPC synthesis module for converting the LPC parameters into output speech. As a further feature of the invention, the speech coder system for a low-bit-rate communication link includes a universal codebook for encoding and decoding speech signals according to stored (trained-in) vocabularies of codewords classified according to a plurality of speaker gender and/or accent types. The codebook is employed to automatically identify a sending speaker's gender and/or accent type and load the corresponding type of vocabulary of codewords in order to more intelligibly encode and decode the speaker's speech.

BRIEF DESCRIPTION OF DRAWINGS

The above objects and further features and advantages of the invention are described in detail below in conjunction with the drawings, of which:

FIG. 1A is a schematic diagram of an encoder for a low-bit-rate speech coder system in accordance with the invention, and FIG. 1B is a schematic diagram of a decoder for the low-bit-rate speech coder system;

FIG. 2 is a state diagram for the encoding of line spectrum pair (LSP) data showing a series of computational subroutines;

DETAILED DESCRIPTION OF INVENTION

Figure 3:
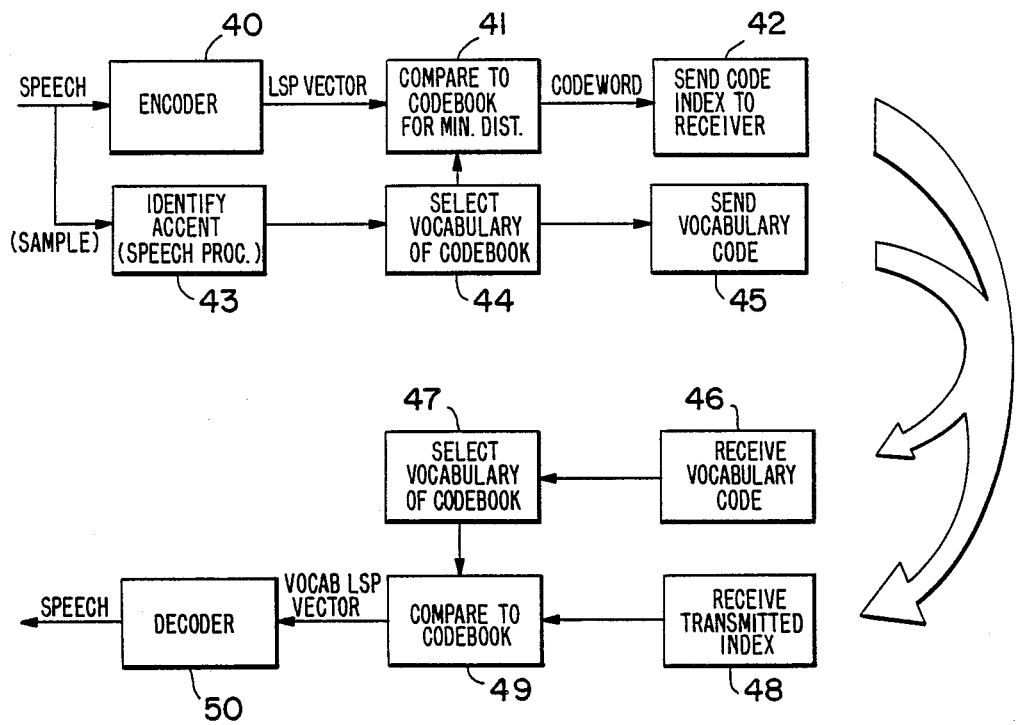
FIG. 3 is a block diagram of an enhancement to the speech coder system using a universal codebook having vocabulary modules in different accents for encoding and decoding.

A preferred embodiment of the invention is described herein using a standard linear predictive coding (LPC) algorithm for converting speech signals into and from frames of LPC parameters. The LPC parameters are postprocessed in accordance with the improved data reduction techniques of the invention. The result is an improved low-bit-rate speech coder which has the desired properties of high intelligibility as well as high resistance to jamming and channel noise. The preferred embodiment is intended for communication at 400 bps over a high frequency (HF) channel, and thus some error protection strategies are also applied. After error protection, the final transmission rate is increased from 400 bps to 600 bps. However, it is to be understood that the principles of the invention are equivalently applicable as data reduction techniques for other speech coder configurations, e.g. those operating over different communication channels, at different transmission rates, and/or with different LPC conversion algorithms.

SYSTEM CONFIGURATION

Referring to FIG. 1A, a speech encoder at the transmitting side of a communication channel has an LPC analysis module 10 for digitizing and processing input speech signals into reflection coefficients and gain and pitch parameters. LPC conversion techniques are well known in the speech processing field, and reference is made to the available literature for detailed explanation thereof. The reflection coefficients RC are converted into line spectrum frequencies (LSFS) data, or so-called line spectrum pair (LSP) data, by an RC-to-LSP conversion module 11, as described further herein. LSP conversion techniques are well known, for example, as described, in "Application of Line-Spectrum Pairs to Low-Bit-Rate Speech Encoders", by G. S. Kang and L. J. Fransen, Naval Research Laboratory, at Proceedings ICASSP, 1985, pp. 244-247. The LSP output of the module 11 is processed through a vector quantization and interpolation (VQ/I) module 12, as explained further below, into vector indexes having a reduced number of spectral bits for transmission over a communication channel to a decoder at the receiving side. The gain parameters of the LPC module 10 are encoded by trellis coding via trellis coder module 13, and the pitch parameters via trellis coder module 14, into a reduced number of bits for transmission.

The decoder shown in FIG. 1B follows the reverse process from encoding. The incoming spectral bits of the transmitted signals are converted to LSP data via vector quanitzation and interpolation (VQ/I) decoder module 15, then processed into reflection coefficients RC via LSP-to-RC conversion module 16. The gain bits of the incoming signals are decoded through a gain decoder 17, and the pitch bits through a pitch decoder 18. The restored LPC parameters are then converted into output speech signals through an LPC synthesis module 19.

SPECTRAL QUANTIZATION

Good reproduction of spectral information can provide the high quality speech output desired in low-bit-rate speech coding. There are two important issues in good spectral quantization: one is feature selection, and the other is encoding technique. In the preferred embodiment, LSPs are selected as the feature vector, and improved vector quantization and interpolation techniques are applied for encoding the LSPs in a reduced number of spectral bits for transmission. Vector indexes are sent out once for every two LPC frames, and upon reception, the missing frame is restored by interpolating from two adjacent frames using information supplied by interpolation bits. The interpolation bits which supply information about how the information for adjacent frames are combined are also sent out every two frames. Gain and pitch bits are decoded to give gain and pitch values every frame.

LSP conversion and encoding are carried out by modules 11 and 12 on the transmitting side, and restored by modules 15 and 16 on the receiving side. In accordance with one aspect of the invention, the roots for the LSP data are computed using a new fast algorithm, instead of FFT as taught in the literature. The LSP data are generated starting with an LPC filter. Two filters, a sum filter and a difference filter, are used. The sum filter has the property of symmetry, while the difference filter has the property of anti-symmetry. The roots of the sum filter and difference filter form the line spectrum frequencies (LSFS). For easy solution of the roots, both sum and difference filters are converted to a polynomial containing real roots only. The three important properties of the resulting LSFS are: (1) the roots of the sum and difference filters are interlaced; (2) all roots are located on a unit circle; and (3) the spectral sensitivity of the LSFS are localized, i.e. an error in one LSF causes spectral error only at that particular LSF.

In FIG. 2, a state diagram for the LSP encoding shows the series of computational subroutines which are called in sequence. In subroutine 20, reflection coefficients RC are derived from input speech signals by an LPC algorithm. In the preferred system, the reflection coefficients RC are an array of 10 single precision variables. In subroutine 21, the reflection coefficients RC are converted to LPC coefficients. Subroutine 22 computes the 10th order sum polynomial for the line spectrum frequencies corresponding to the LPC coefficients, subroutine 23 converts the 10th order sum polynomial to 5th order, and subroutine 24 computes the sum polynomial roots, finds the arccosine of these roots, and orders them. Subroutine 25 computes the 10th order difference polynomial for the line spectrum frequencies, subroutine 26 converts the 10th order difference polynomial to 5th order, and subroutine 27 computes the difference polynomial roots, finds the arccosine of these roots, and orders them.

At subroutine 28, the sum and difference polynomial roots are combined and ordered in an array RTL of 10 LSP coefficients which are single precision variables. At subroutine 29, the LPC spectral amplitude is computed as an array WEIT of 10 weighting coefficients which are single precision variables, and a scaling variable MINEXP is selected for the WEIT array. In the invention, the LPC spectral amplitude is used for the weighting coefficients in order to provide a significant advantage in time savings over the conventional use of group delay function as the weighting coefficients. At subroutine 30, the weighting coefficients WEIT are applied to the array RTL of LSP coefficients to derive the output vector indexes. The vector indexes are sent once for every two LPC frames to provide an output of spectral bits in accordance with the desired low bit rate of the speech coder. The subroutine computations are explained in further detail below.

RC To LPC Conversion

Subroutine 21 converts the array RC of 10 reflection coefficients to linear predictive coding (LPC) coefficients A according to the following formula:

$$A_k^k = RC^k \quad k=1,10$$

$$A_l^k = A_l^{k-1} - RC^k A_{k-l}^{k-1} \quad k=2,10, l=1,k-1$$

In the above equation, the superscript represents the iteration number. During the computation, the A array is single precision, whereas after computation, the A array is converted to double precision.

Sum Polynomial Computation

The subroutine 22 computes the sum polynomial coefficients. The input ALP is an array of 10 LPC coefficients which are double precision variables, and the output PL is an array of 11 sum polynomial coefficients which are double precision variables. In a first step, an 11th order polynomial is computed according to the following formula:

$$P(1) = 1$$

$$P(12) = 1$$

$$P(k) = ALP(k-1) - ALP(12-k) \quad k=2,6$$

$$P(k) = P(13-k) \quad k=7,11$$

The array P of 12 coefficients are double precision variables. In a second step, the 11th order polynomial is reduced to 10th order according to the following formula:

$$PL(1) = 1$$

$$PL(k) = P(k) - PL(k-1) \quad k=2,6$$

$$PL(k) = PL(12-k) \quad k=7,11$$

The array of 11 PL coefficients are double precision variables.

Fifth Order Polynomial Conversion

Subroutines 23 and 26 reduces the 10th order sum polynomial and difference polynomial to 5th order. The input COE is an array of 11 coefficients which are either sum polynomial PL coefficients or difference polynomial QL coefficients, and the output COEI is an array of 6 coefficients which are either sum polynomial P1 coefficients or the difference polynomial Q1 coefficients. The 5th order polynomial coefficients are computed according to the following formula:

$$COE1(1) = \frac{0.5COE(6) - COE(4) + COE(2)}{16}$$

$$COE1(2) = \frac{COE(5) - 3COE(3) + 5}{16}$$

$$COE1(3) = \frac{2COE(4) - 8COE(2)}{16}$$

$$COE1(4) = \frac{4COE(3) - 20}{16}$$

$$COE1(5) = \frac{8COE(2)}{16}$$

-continued $$COE1(6) = 1$$

During the computation, the input COE array is double precision, whereas after computation, the output COE1 array is single precision.

Difference Polynomial Computation

The subroutine 25 computes the difference polynomial coefficients. The input ALP is an array of 10 LPC coefficients which are double precision variables, and the output QL is an array of 11 sum polynomial coefficients which are double precision variables. In a first step, an 11th order polynomial coefficients are computed according to the following formula:

$$Q(1) = 1$$

$$Q(12) = -1$$

$$Q(k = ALP(k-1) - ALP(12-k) \quad k=2,6$$

$$Q(k) = -Q(13-k) \quad k=7,12$$

The array Q of 12 coefficients are double precision variables. In a second step, the 11th order polynomial is reduced to 10th order according to the following formula:

$$QL(1) = 1$$

$$QL(k) = Q(k) + QL(k-1) \quad k=2,6$$

$$QL(k) = -QL(12-l) \quad k=7,11$$

The array of 11 QL coefficients are double precision variables.

Polynomial Root Determination

Subroutines 24 and 27 determine the real roots of the respective 5th order polynomials. The input CN is an array of 6 polynomial coefficients in single precision, and the output is an array RTA of 5 real roots in single precision, and an array RP of 5 real root index. The polynomial roots are determined in two steps. In the first step, five approximate roots are determined between $-1$ and 1. The entire range between $-1$ and 1 is divided into 128 intervals. The approximate roots are found by searching through the intervals with a sign change in polynomial value. In the second step, the more accurate roots are determined based upon the approximate roots. If FR(i−1) and FR(i) are the polynomial values at point i−1 and i, and XR(j−1) is the approximate jth root, then the improved root is computed as follows:

$$RTS(j) = XR(i-1) + \frac{FR(i-1)}{64(FR(i-1) - FR(i))}$$

$$RP(j) = i$$

Next the 5 root angles are computed, as below, and ordered according to their magnitude:

$$RTA(j) = \cos^{-1}(RTS(j)) \quad j=1,5$$

Polynomial Roots Ordering

The subroutine 28 orders the roots in increasing magnitude. The inputs are RTA, an array of sum polynomial roots, and RTB, an array of difference polynomial roots, which are combined and ordered into an output RTL array of 10 line spectrum frequencies as an output vector for vector quantization. Because of the interlacing property of line spectrum frequencies, the ordering can be simply done according to the following equation:

$RTL(2k-1)=RTA(k)\ k=1,5$ $RTL(2k)=RTB(k)\ k=1,5$

Weighting Coefficients Computation

Subroutines 29 and 30 compute and apply the LPC spectral amplitudes as weighting coefficients at the line spectrum frequencies. The inputs are the array A of 10 single precision LPC coefficients, and the array RTL of 10 single precision line spectrum frequencies. The output WEIT is an array of 10 weighting coefficients in single precision, and MINEXP is a scaling factor of the weighting coefficients. The weighting coefficients WEIT is a product of the term WEGS, an LPC spectral amplitude, and WFRE, a perceptually based factor, as follows:

$WEIT(k) = WEGS(k)*WFRE(k)\ k=1,10$

In computing the LPC spectral amplitude WEGS, a real component REALP and an imaginary component IMAGP are computed and combined as follows:

$$REALP(k) = 1. - \sum_{j=1}^{10} A(j)\cos(j(RTL(K)))\ k = 1,10$$

$$IMAGP(k) = \sum_{j=1}^{10} A(j)\sin(j(RTL(k)))\ k = 1,10$$

$$WEGS(k) = \frac{1.}{\sqrt{(REALP)^2 + (IMAGP)^2}}\ k = 1,10$$

The perceptually based factor is given as follows:

$WFRE(k)=1\ RTL(k)<0.25$ $WFRE(k)=1.0-0.5*(RTL(k)-0.25)/0.75$
$RTL(k)>0.25$

In the above computation, four mathematical functions, sine, cosine, arccosine, and square root, are required. They are all computed by approximation using the same interpolation technique. First, the input value is searched to locate three nearest points in a table of values. Next, an interpolated value is computed using a parabola passing through the three points. Other suitable techniques for computing values for these mathematical functions may also be used.

CODEBOOK UTILIZATION

As shown in FIG. 3 (top part of the diagram), a codebook can be utilized to transmit words having a predefined spectral bit configuration which would reduce the incidence of reception of unintelligible speech and be more readily identified by the receiver. The codebook is provided with a given vocabulary of codewords for which LSP vector indexes have been generated and stored during a training sequence. The vocabulary may be selected to correspond to the range of words a speaker may use in a given environment. In using the codebook, the LSP vector output from the encoder 40, as previously described, is compared with the codebook of stored codewords, at block 41, and the optimally matching codeword is selected such that the distortion from the input vector is computed to be a minimum. The distortion is computed as follows:

$$dist = \sum_{k=1}^{10} \max(W_k, WC_i)(L_k - C_i)^2$$

where $C_k$, $k=1,10$, represents each codeword with 10 LSP coefficients and $WC_k$, $k=1,10$, represents the weighting coefficients associated with each codeword. The stored codebook index corresponding to the optimal codeword is then sent out to the receiver, as indicated at block 42.

The success of the vector quantization technique can depend on the quality of the codebook. An algorithm for codebook design using clustering in the training sequence through a non-iterative codebook initialization procedure is described in "Improving The Codebook Design For Vector Quantization", by Y. J. Liu, ITT Defense Communication Division, at Proceedings IEEE Military Communications, 1987, pp. 556-559. A database consisting of 54 male speakers is utilized to include all phonemes of English and normal English accents. An initial codebook is designed by selecting only one codeword initially from the training data base, instead of choosing all codewords at random. The desired number of codewords is subsequently generated through clustering. The initial codebook is then optimized through an iterative procedure. During the design of the codebook, a unique perceptual distortion measure is adopted. The same distortion measure is utilized as the perceptually based factor in the weighting of LSP data in the vector quantization technique described previously. As a result, better speech intelligibility is reproduced.

The codebook may be enhanced to work for other accents and female speech patterns, i.e. for greater speaker independence, by including a plurality of vocabulary modules for each accent in a so-called universal codebook. The size of the universal codebook depends on the number of accents and range of words and performance desired. The universal codebook is utilized for encoding a transmission from a speaker and decoding at the receiver. Referring to FIG. 3, a speaker inputs an initial speech sample to the speech coder system, as indicated at block 43. A speech processor is used to identify the speaker's accent using a recognition algorithm similar to those used conventionally for voice recognition or speaker identification. The processor need only identify the accent, not the speaker or the speech, thereby making its task simpler.

Based upon the identified accent, the corresponding vocabulary module is selected, at block 44, for comparison to the LSP vectors output by the encoder for the input speech. The predefined (standardized) codewords of the universal codebook corresponding to the input speech are sent to the receiver in order to provide more reliable word identification since spurious spectral information generated by differing accents is reduced or removed from the code indexes transmitted. A code signal identifying the vocabulary module corresponding to the speaker's identified accent is also sent to the receiver, as indicated at block 45. At the receiver, blocks 46 and 47, the vocabulary module code is used to select the corresponding vocabulary module of the universal codebook for comparison to the transmitted indexes, as indicated at blocks 48 and 49. The stored LSP vectors in the selected accent are then output to the decoder 50 for restoration to output speech in that accent. In this system, the accent is automatically determined by the system and not by the speaker. The universal codebook provides no degradation in speech intelligibility due to different accents in low-bit-rate transmission.

PITCH AND GAIN TRELLIS CODING

Trellis coding is employed to encode the pitch and gain data from LPC analysis into pitch and gain bits for transmission to the receiver (see FIG. 1). A "fake process" trellis coder has previously been employed, e.g., as described in "A Multiple Rate Low Rate Voice CO-DEC", by J. Rothweiler and J. Carmody, Proceedings ICASSP, 1985, pp. 248–251. In this process, a table look up (M,L) search is performed to achieve optimum match between the input data and the coded data. The table together with certain parameters such as search depth and prediction gain are estimated from a training data base.

Figure 4:
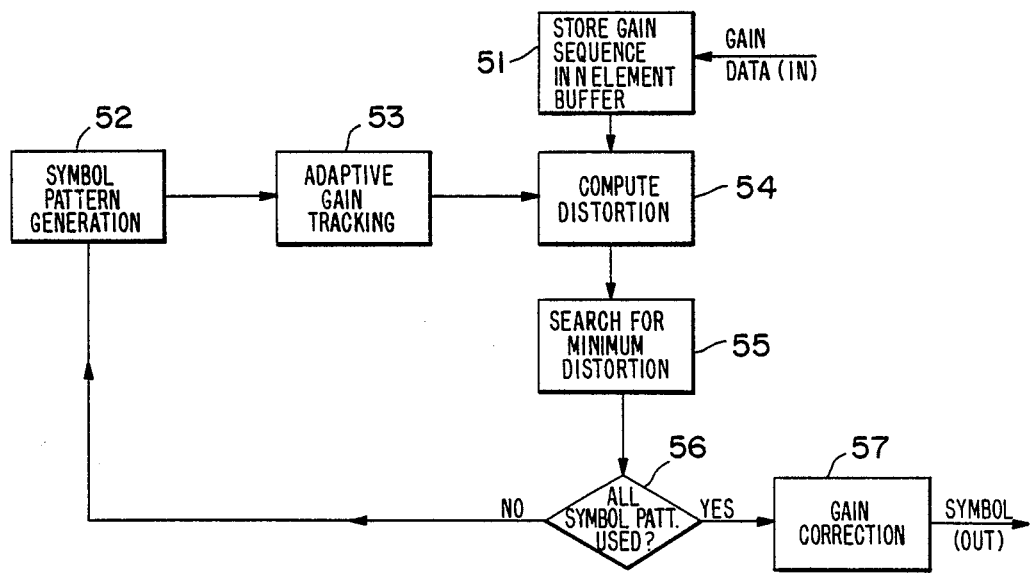
FIG. 4 is a block diagram of an adaptive tracking trellis gain coder used in the invention.

In accordance with a further aspect of the invention, adaptive tracking techniques are utilized to track the input data variations closely, instead of depending upon a fixed table. A block diagram of the operation of an example of the adaptive tracking trellis gain coder is shown in FIG. 4. At block 51, the gain data from the LPC analysis module 10 of the encoder is fetched and stored in sequence in a buffer for a predetermined number N of frames, e.g. a history of gain for three frames. At block 52, a symbol pattern generator generates an N-symbol sequence. For the example of N=3, each symbol ranges from 0 to 3, and there are 64 possible three-symbol sequences with two bits per symbol. At block 53, the three-symbol sequence is adaptively tracked, and three output gain values are generated according to the following formulas:

$$D_k = D_{k-1} f + \delta$$

$$G_k = \beta G_{k-1} - D_k \quad SYM = 1 \text{ or } 2$$

$$G_k = \beta G_{k-1} + D_k \quad SYM = 0 \text{ or } 3$$

The factor f is set equal to 2.8 for input symbol (SYM) equal to 0 or 3, and is set equal to 0.39 for input symbol equal to 1 or 2. The factor $\delta$ is set equal to 5 for input symbol equal to 0 or 3, and is set equal to 1 for input symbol equal to 1 or 2. $\beta$ is set equal to 0.9.

At block 54, the distortion between the input gain sequence $GI_k$, k=1,3, from block 51, and the adaptively generated gain sequence $G_k$, k=1,3, from block 53, is computed according to the following formula:

$$dist = \sum_{k=1}^{3} |G_k - GI_k|$$

The optimum symbol sequence among the 64 possible sequences having the minimum distortion is searched, as indicated at block 55, and the search is terminated when all 64 symbol sequences have been used, as indicated at block 56. The first symbol of the optimum three-symbol sequence is then selected for output as the gain bits for transmission. At block 57, correction is made for possible trellis gain error, as happens when the output gain is zero for a nonzero input gain. Because of the three-frame history used in the search process, each frame is tracked three times. The correction logic selects the gain whenever the single frame distortion is minimum for any of the three possible candidates.

Figure 5:
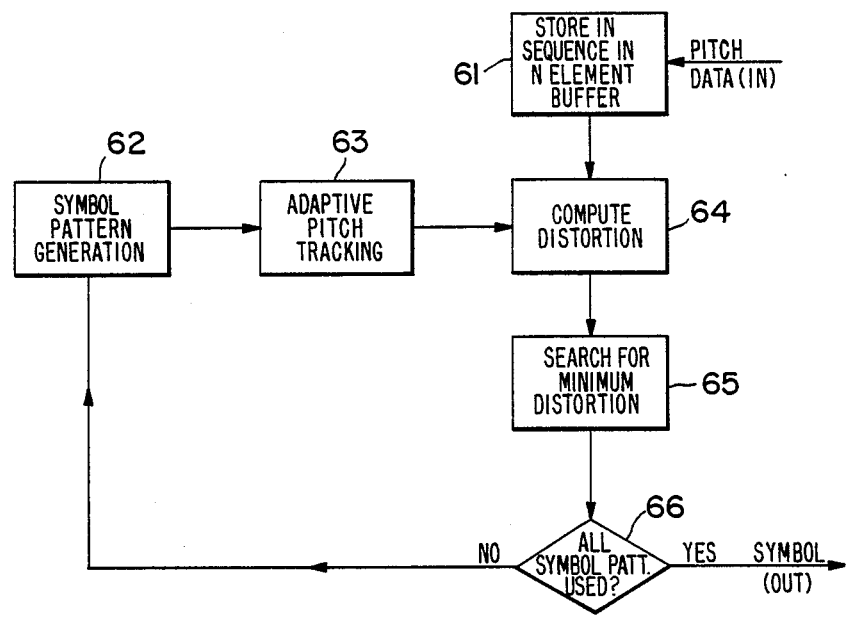
FIG. 5 is a block diagram of an adaptive tracking trellis pitch coder used in the invention.

A block diagram of the similar operation of an example of the adaptive tracking trellis pitch coder is shown in FIG. 5. At block 61, the pitch data from the LPC analysis module 10 of the encoder is fetched and stored in sequence in a buffer for a predetermined number M of frames, e.g. a history of pitch for four frames. At block 62, a symbol pattern generator generates an M-symbol sequence. Each symbol ranges from 0 to 1, and there are 16 possible four-symbol sequences with one bit per symbol. At block 63, the four-symbol sequence is adaptively tracked, and four output pitch values are generated according to the following formulas:

$$P_k = \beta P_{k-1} \pm D_k$$

$$D_k = 0.04 D_{k-1} + 2$$

$$D_k = 0.04 D_{k-1} + 0.1$$

The plus sign is for input symbol 1, while the negative sign is for input symbol 0. If there are three continuous frames with input symbol equal to 1, then $D_k$ is computed as in the first given equation, otherwise it is computed as in the second given equation.

At block 64, the distortion between the input pitch sequence $PS_k$, k=1,4, from block 61, and the adaptively generated pitch sequence $P_k$, k=1,4, from block 63, is computed according to the following formula:

$$dist = \sum_{k=1}^{4} |P_k - PS_k|$$

The optimum symbol sequence among the 16 possible sequences having the minimum distortion is searched, as indicated at block 65, and the search is terminated when all 16 symbol sequences have been used, as indicated at block 66. The first symbol of the optimum four-symbol sequence is then selected for output as the pitch bit for transmission.

Certain unavoidable errors may occasionally exist, for example, when a frame with a very weak gain appears between two frames with a very strong gain. These errors can be postfiltered in the decoder. The gain decoder performance obtained in a working example is demonstrated in FIG. 7, which is a plot of the input gain and the decoded gain for the word "SHOAL". The close match is evident in the plot during the entire duration of the word. The average S/N was computed to be about 27.5 db.

RECEIVER DECODING

The incoming bit stream sent from the encoder at the transmitting side of a communication channel is received by the decoder, and is decomposed into four fields: interpolation bit, pitch, gain, and vector index. Pitch and gain are decoded following the routine used in the transmitter. The vector index is decoded by search through the universal codebook to determine the LSP codeword, which is then converted to LPC coefficients, as described further below. The frame is decoded to be voiced if the vector index is greater than a given threshold, otherwise it is unvoiced.

For every two frames, the voicing and the LSP coefficients are interpolated. If the interpolation symbol is two or three, voicing is the same as the previous frame. The LSP coefficients are interpolated using an interpolation factor for the previous and future frames. A suitable factor, such as 0.1, 0.3, 0.7, or 0.9, is selected depending upon the expected speech environment and the communication channel. The interpolated LSP coefficients are obtained by adding those of the previous frame multiplied by the factor f, and those of the future frame by $(1-f)$. If the interpolation symbol is zero or one, voicing is the same as the future frame.

Figure 6:
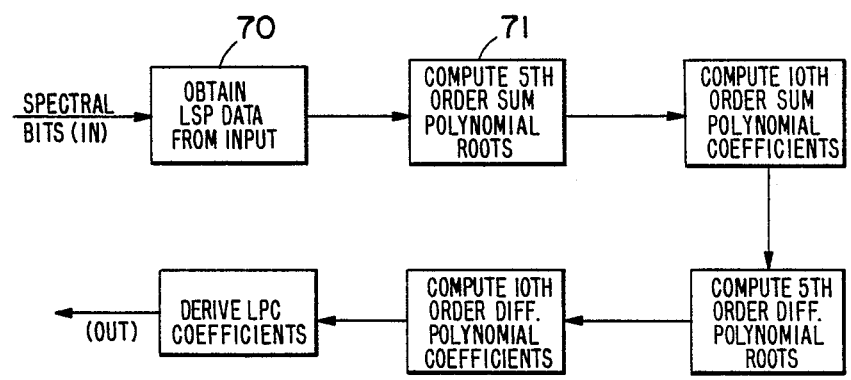
FIG. 6 is a block diagram of the subroutines used in decoding the LSP data transmitted from the encoder.

A state diagram of the subroutines for decoding the LSP vector indexes is shown in FIG. 6. At subroutine 70, the incoming signals are parsed and the LSP data are interpolated into frames. The LSP data are sent once for every two LPC frames, and the LSP coefficients for each missing frame are interpolated as discussed previously. The LSP coefficients are then decoded into LPC coefficients. In the decoding process, the input is an array RTL of 10 line spectrum frequencies in single precision, and the output is an array AZ of 10 LPC coefficients, and a scaling factor ISCA of the LPC coefficients. First, the 5th order sum polynomial roots are computed, as indicated at subroutine 71, from the input line spectrum frequencies according to the following formula:

$$RTS(k) = COS(RTL(2k-1)) \quad k=1,5$$

As indicated at subroutine 72, the 10th order sum polynomial coefficients CK(j), j=1,11, are then synthesized first by computing the four coefficients G1, G2, G3, and G4 in double precision from the input array R of 5 line spectrum frequencies in single precision:

$$G1 = R_1 + R_2 + R_3 + R_4$$

$$G2 = (R_1 - R_2)(R_3 + R_4) + R_3R_4 + R_1R_2$$

$$G3 = G_1^2 + (R_1 + R_2)(R_3R_4 + 0.5) + (R_3 + R_4)(R_1R_2 + 0.5)$$

$$G4 = (R_1 + R_2)(R_3 + R_4)/2 + (R_1R_2 + 0.5)(R_3R_4 + 0.5) + 0.125$$

Next, the polynomial coefficients CF(j), j=1,11, are computed in double precision according to the following equations:

$$CF(1) = 1$$

$$CF(2) = -2(G1 + R_6)$$

$$CF(3) = 4(G2 + G1)(R_6) - 1.25)$$

$$CF(4) = -8(G3 + (G2 + 1)(R_6) + G_1^2)$$

$$CF(5) = 16(G4 + G2/4 + G3)(R_6) + 0.25)$$

$$CF(6) = -16(G3 + 2)(G4)(R_6)$$

$$CF(7) = CF(5)$$

$$CF(8) = CF(4)$$

$$CF(9) = CF(3)$$

$$CF(10) = CF(2)$$

$$CF(11) = 1$$

Finally, the 11th order sum polynomial coefficients PZ(j), j=1,12, are synthesized as given below:

$$PZ(1) = CK(1)$$

$$PZ(j) = CK(j) + CK(j-1) \quad j=2,6$$

$$PZ(j) = PZ(13-j) \quad j=7,12$$

As shown at subroutine 73, the fifth order difference polynomial roots are computed from the input line spectrum frequencies, as follows:

$$RTS(k) = COS(RTL(2k)) \quad k=1,5$$

Following the same procedures as described for sum polynomials, the 10th order difference polynomial coefficients CD(j), j=1,11, are then synthesized, as indicated at subroutine 74. The 11th order difference polynomial coefficients QZ(j), j=1,12, are then generated as shown below:

$$QZ(1) = CD(1)$$

$$QZ(k) = CD(k) = CD(k-1)$$

$$QZ(k) = -QZ(13-k) \quad k=7,12$$

After obtaining both the 11th order sum polynomial coefficients and the 11th order difference polynomial coefficients, the 10 LPC coefficients are then derived as follows:

$$AZ(j) = (PZ(j) + QZ(j))/2 \quad j=1,10$$

The LPC coefficients are in single precision with a scaling factor changing from frame to frame.

SIMULATION RESULTS

The speech coder system was tested using both Diagnostic Rhyme Tests (DRT) and informal listening tests. DRT tests were performed on clean speech to determine the inherent speech intelligibility of the coder design. Informal listening tests were performed to determine the effects of various acoustic and speech variations. The test results indicate that the speech coder system provides high quality speech coding at 400 bps, and shows that it is feasible to obtain high speech intelligibility at low-bit-rate transmission while maintaining minimum complexity.

The specific embodiments of the invention described herein are intended to be illustrative only, and many other variations and modifications may be made thereto in accordance with the principles of the invention. All such embodiments and variations and modifications thereof are considered to be within the scope of the invention, as defined in the following claims.

We claim:

1. A speech coder system comprising an encoder for encoding input speech signals for transmission over a communication channel at a low bit rate, said encoder including:

an LPC analysis module for converting input speech to linear predictive coding (LPC) parameters for each of a sequence of LPC frames;

an LSP conversion module for converting the LPC parameters to corresponding line spectrum frequencies (LSP) data, and a vector quantization and interpolation (VQ/I) encoder module for encoding the LSP data into vector indexes for transmission, wherein said VQ/I encoder module includes vector quantizing means for computing weighting coefficients for the LSP data, each of which is the product of LPC spectral amplitude and a predetermined factor, and means for applying said weighting coefficients to said LSP data.

2. A speech coder system according to claim 1, wherein said VQ/I encoder module outputs one vector index for every two LPC frames in order to provide a low transmission bit rate.

3. A speech coder system according to claim wherein said LPC parameters include pitch and gain data, and said encoder further comprises trellis coders for respectively encoding said pitch and gain data into pitch and gain bits for transmission.

4. A speech coder system according to claim 3, wherein said trellis coders provide for adaptive tracking of respective sequences of pitch and gain data, and for selecting pitch and gain bits corresponding to minimum distortion in the respective sequences.

5. A speech coder system according to claim 1, further comprising a decoder for decoding incoming low-bit-rate signals transmitted by said encoder over a communication channel, said decoder including:

a vector quantization and interpolation (VQ/I) decoder module for decoding said incoming signals into corresponding line spectrum frequencies (LSP) data;

an LSP conversion module for converting the LSP data to corresponding LPC parameters; and an LPC synthesis module for converting the LPC parameters into output speech.

6. A speech coder system according to claim 5, wherein said VQ/I encoder module outputs one vector index for every two LPC frames in order to provide a low transmission bit rate, and said VQ/I decoder module generates LPC parameters for every two LPC frames by interpolating an LPC frame from the vector indexes for adjacent frames.

7. A speech coder system according to claim 5, wherein said LPC parameters include pitch and gain data, and said encoder further comprises trellis coders for respectively encoding said pitch and gain data into pitch and gain bits for transmission, and said decoder further comprises pitch and gain decoders for respectively restoring said pitch and gain data from said pitch and gain bits.

8. A speech coder system according to claim 7, wherein said trellis coders of said encoder provide for adaptive tracking of respective sequences of pitch and gain data, and for selecting pitch and gain bits corresponding to minimum distortion in the respective sequences, and said trellis decoders of said decoder respectively restore said pitch and gain data from said selected pitch and gain bits.

9. A speech coder system according to claim 5, wherein said encoder further comprises a codebook for storing a vocabulary of codewords in the form of respectively defined vector indexes corresponding to sound to be spoken as input speech signals to said encoder, and means for comparing the quantized vector indexes output from said VQ/I encoder module to the codewords of said codebook and outputting the defined vector indexes corresponding thereto with a minimum distortion for transmission.

10. A speech coder system according to claim 9, wherein said codebook is a universal codebook for storing a plurality of vocabulary modules each corresponding to a vocabulary of codewords in the form of defined standard vector indexes corresponding to wound spoken as input speech signals in a respective spoken accent, and wherein said encoder includes speech identifying means for receiving a sample of input speech signals from a speaker and determining a corresponding accent of the speaker, selection means for selecting a vocabulary module of said universal codebook corresponding to said determined accent, and comparing means for comparing the quantized vector indexes output from said VQ/I encoder module in response to input speech in said accent to said selected vocabulary module and for outputting the defined standard vector indexes corresponding thereto.

11. A speech coder system according to claim 10, wherein said decoder includes a corresponding universal codebook for storing a plurality of vocabulary modules each having a vocabulary of codewords in the form of defined accented vector indexes corresponding to a respective spoken accent, wherein said speech identifying means of said encoder provides a vocabulary code signal identifying the accent of the speaker for transmission, and wherein said decoder includes selection means for receiving the transmitted vocabulary code signal and selecting a vocabulary module of said universal codebook corresponding to the speaker's accent, and comparing means for comparing the transmitted standard vector indexes to said selected vocabulary module and for outputting corresponding accented vector indexes to said VQ/I decoder module for decoding into output speech in said accent.

12. A speech coder system according to claim 1, wherein said LSP conversion module includes a sum filter and a difference filter for converting the LPC parameters to a sum polynomial and a difference polynomial, respectively, having real roots only, and means for solving the roots of the sum and difference polynomials.

13. A speech coder system according to claim 12, wherein said LPC analysis module outputs LPC parameters having N LPC coefficients, and said means for solving of said LSP conversion module includes means for computing respective Nth order polynomials from the LPC coefficients, reducing the respective polynomial orders to N/2, solving the respective polynomial roots, and combining and ordering all N roots.

14. A speech coder system according to claim 5, wherein said LPC analysis module of said encoder outputs LPC parameters having N LPC coefficients, and said LSP conversion module of said decoder includes means for obtaining LPC coefficients from said LSP coefficients.

* * * * *